(12) United States Patent
Fujita et al.

(10) Patent No.: US 8,068,308 B2
(45) Date of Patent: Nov. 29, 2011

(54) SERVO SIGNAL RECORDING APPARATUS, INFORMATION RECORDING APPARATUS, AND TRACKING SERVO METHOD

(75) Inventors: Masao Fujita, Osaka (JP); Shinji Kawakami, Osaka (JP); Toshio Kawakita, Osaka (JP); Sadamu Kuse, Osaka (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 9 days.

(21) Appl. No.: 12/476,773

(22) Filed: Jun. 2, 2009

(65) Prior Publication Data

US 2009/0296269 A1    Dec. 3, 2009

(30) Foreign Application Priority Data

Jun. 2, 2008   (JP) ................. 2008-144774

(51) Int. Cl.
*G11B 5/584* (2006.01)
*G11B 21/02* (2006.01)
(52) U.S. Cl. .................... 360/77.12; 360/75
(58) Field of Classification Search ............... None
See application file for complete search history.

(56) References Cited

U.S. PATENT DOCUMENTS

| | | | |
|---|---|---|---|
| 5,689,384 A | 11/1997 | Albrecht et al. | |
| 6,226,688 B1 | 5/2001 | Frary | |
| 2002/0163752 A1* | 11/2002 | Peterson | 360/76 |
| 2004/0105294 A1 | 6/2004 | Kisaka | |
| 2005/0094308 A1* | 5/2005 | Mahnad et al. | 360/77.12 |
| 2007/0230033 A1* | 10/2007 | McAllister et al. | 360/77.12 |

FOREIGN PATENT DOCUMENTS

| | | |
|---|---|---|
| JP | 8-030942 | 2/1996 |
| JP | 2004-086959 | 3/2004 |

\* cited by examiner

*Primary Examiner* — Andrew L Sniezek
(74) *Attorney, Agent, or Firm* — Birch, Stewart, Kolasch & Birch, LLP

(57) ABSTRACT

In the apparatus and method of the invention, a servo signal reproduction unit generates a PES from a servo signal reproduced from a magnetic tape, and a frequency conversion unit performs FFT processing of the PES to generate frequency component information. Then, a filter value generation unit generates filter values based on the frequency component information and writes these to a memory. When recording various data signals to the magnetic tape, the filter values are read from the memory and a control filter serving as a notch filter is incorporated into a feedback control for a tracking servo. This enables periodic and narrow-band noise to be removed from a PES, consequently reducing PESs. Accordingly, learning-type optimum notch filter control that allows a magnetic head to follow recording tracks at high speed and with high precision is possible even when the recording track width is reduced and the tape speed is increased.

8 Claims, 7 Drawing Sheets

SERVO SIGNAL RECORDING APPARATUS, INFORMATION RECORDING APPARATUS, AND TRACKING SERVO METHOD

BACKGROUND OF THE INVENTION

1. Field of the Invention

The present invention relates to a servo signal recording apparatus capable of recording a servo signal to a magnetic tape, and more specifically relates to an information recording apparatus capable of recording a variety of information to a magnetic tape while performing tracking servo control based on the servo signal recorded on the magnetic tape. In particular, the present invention relates to a learning-type optimum notch filter control system adaptable to a data storage system for a computer, and also relates to a recording and reproduction apparatus capable of implementing such a learning-type optimum notch filter control system.

2. Description of Related Art

Magnetic tape has a variety of applications such as audio tape, video tape, and computer tape. Particularly in the field of data backup tapes, magnetic tapes with a recording capacity of 800 GB (giga byte) or more per reel have been commercialized following increases in the capacity of hard disks for backup. High capacity backup tapes have been proposed with the development hereafter of techniques for backing up data exceeding 4 TB (tera byte).

One conceivable method of increasing the capacity of magnetic tape is, for example, to make the magnetic tape thinner to increase the tape length per reel, without increasing the reel diameter of the magnetic tape per reel. Another method involves shortening the recording wavelength of data recorded on the magnetic tape to increase the longitudinal recording density of the magnetic tape. A further method involves reducing the recording track width of the magnetic tape to increase the lateral recording density of the magnetic tape (high recording density technique).

When the recording track width is reduced by employing a high recording density technique for magnetic tape, the magnetic head is unable to accurately follow the recording track due to the lateral motion of the magnetic tape during data recording or reproduction, or the like. If the magnetic head is unable to accurately follow the recording track, errors are more likely to occur in writing information to the magnetic tape or in recording information from the magnetic tape. In view of this, currently, systems that are provided with a servo system using a servo signal recorded to a magnetic layer or a back-coat layer of the magnetic tape during manufacture have become mainstream.

As for servo systems, there is a magnetic servo system and an optical servo system. With the magnetic servo system, a servo signal is magnetically recorded to a magnetic layer of the magnetic tape, and the servo signal is magnetically read to perform servo control. With the optical servo system, a servo signal constituted by a recessed array is formed on a back-coat layer on the magnetic tape with laser irradiation or the like, and the recessed array is optically read to perform servo control.

These servo systems enable the magnetic head to follow the recording track when recording data to a magnetic tape or reproducing data from a magnetic tape, even when the magnetic tape moves laterally relative to the magnetic head. Specifically, the servo signal recorded on the magnetic tape is firstly read with a servo head. Then, according to the read servo signal, the position of a head unit (which includes at least a data recording head and a data reproducing head) along the width of the magnetic tape is controlled so as to allow the data recording head or the data reproducing head to follow the recording track. This enables information to be recorded to the correct position on a magnetic tape, and information recorded on a magnetic tape to be correctly reproduced.

Disclosed in Patent Document 1 (JP H8-30942A) and Patent Document 2 (U.S. Pat. No. 6,226,688) are timing based servo systems. With these timing based servo systems, the servo signal is a pattern that is at an angle relative to the width direction of the magnetic tape. An apparatus compatible with such timing based servo systems confirms the head position from the time intervals between the peaks of the reproduction waveform when the servo signal is reproduced.

Disclosed in Patent Document 3 (JP 2004-86959A) are a difference detector and a set value modification unit. The difference detector detects a difference between the resonance frequency of the head actuator and the center frequency set in the notch filter. The set value modification unit modifies the set value of the center frequency in the notch filter, based on the difference detected by the difference detector.

However, a problem with the techniques disclosed in Patent Documents 1 and 2 is that a PES (position error signal) must be of a lesser amplitude when the recording track width is narrowed following an increase in the information recording density of the magnetic tape. Patent Document 3 discloses a technique for reducing the resonance frequency of the actuator with the notch filter but does not disclose a technique for reducing other factors such as periodic noise, narrowband noise, and the like.

SUMMARY OF THE INVENTION

Therefore, with the foregoing in mind, it is an object of the present invention to provide a servo signal recording apparatus that enables learning-type optimum notch filter control that allows a magnetic head to follow a recording track at high speed and with high precision even in the case where the recording track width is reduced and the tape speed is increased. Another object of the present invention is to provide an information recording apparatus that enables such learning-type optimum notch filter control, and still another object thereof is to provide a tracking servo method that enables such learning-type optimum notch filter control.

A servo signal recording apparatus of the present invention is capable of recording a servo signal on a servo track of a magnetic tape, and includes a servo signal reproduction unit that reproduces a servo signal recorded on the magnetic tape, a frequency conversion unit that generates frequency component information by applying a Fourier transform to a position error signal generated from the servo signal reproduced by the servo signal reproduction unit, a filter value generation unit that generates a filter value based on the frequency component information generated by the frequency conversion unit, and a recording control unit that writes the filter value generated by the filter value generation unit to a recording medium, wherein the filter value generation unit generates a filter value that enables removal of a periodic noise component included in the frequency component information.

Another servo signal recording apparatus of the present invention is provided with a servo signal recording unit capable of recording a servo signal on a servo track of a magnetic tape, and includes a servo signal reproduction unit that reproduces a servo signal recorded on the magnetic tape, a frequency conversion unit that generates frequency component information by applying a Fourier transform to a position error signal generated from the servo signal reproduced by the servo signal reproduction unit, and a filter value generation unit that generates a filter value based on the frequency component information generated by the frequency conversion unit, wherein the filter value generation unit generates a filter value that enables removal of a periodic noise component included in the frequency component information, and the servo signal recording unit modulates a servo signal based on the filter value generated by the filter value generation unit and records the modulated servo signal to the magnetic tape.

An information recording apparatus of the present invention includes a head unit that includes a data head capable of recording a data signal to a magnetic tape and a servo head capable of reproducing a servo signal recorded on the magnetic tape, the head unit being provided so as to be movable along a width of the magnetic tape, a control unit that calculates a position error signal based on the servo signal reproduced by the servo signal reproduction unit and calculates the amount of travel for the head unit based on the calculated position error signal, and a movement unit that moves the head unit along the width of the magnetic tape, based on the amount of travel calculated by the control unit. The control unit includes a frequency conversion unit that generates frequency component information by applying a Fourier transform to the position error signal generated from the servo signal reproduced by the servo signal reproduction unit, a filter value generation unit that generates a filter value based on the frequency component information generated by the frequency conversion unit, a recording control unit that writes the filter value generated by the filter value generation unit to a recording medium, and a filter that filters the position error signal based on the filter value read from the recording medium. The filter value generation unit generates a filter value that enables removal of a periodic noise component included in the frequency component information.

A tracking servo method of the present invention includes the steps of reproducing a servo signal recorded on a servo track of a magnetic tape, using a servo head, calculating a position error signal based on the servo signal, and performing control so that a head unit moves along the width of the magnetic tape, the head unit including the servo head and a data head capable of recording a digital signal to the magnetic tape based on the position error signal. The tracking servo method further includes the steps of generating frequency component information by applying a Fourier transform to the position error signal, generating a filter value that enables removal of a noise component included in the frequency component information, recording the filter value to a recording medium, and reading out the filter value from the recording medium to filter the position error signal.

The present invention enables periodic noise and narrow-band noise to be removed from the position error signal by incorporating a filter into feedback control, thereby consequently reducing position error signals.

DETAILED DESCRIPTION OF THE INVENTION

Hereinafter, the present invention will be described by way of illustrative embodiments with reference to the drawings.

Embodiment 1

Figure 1:
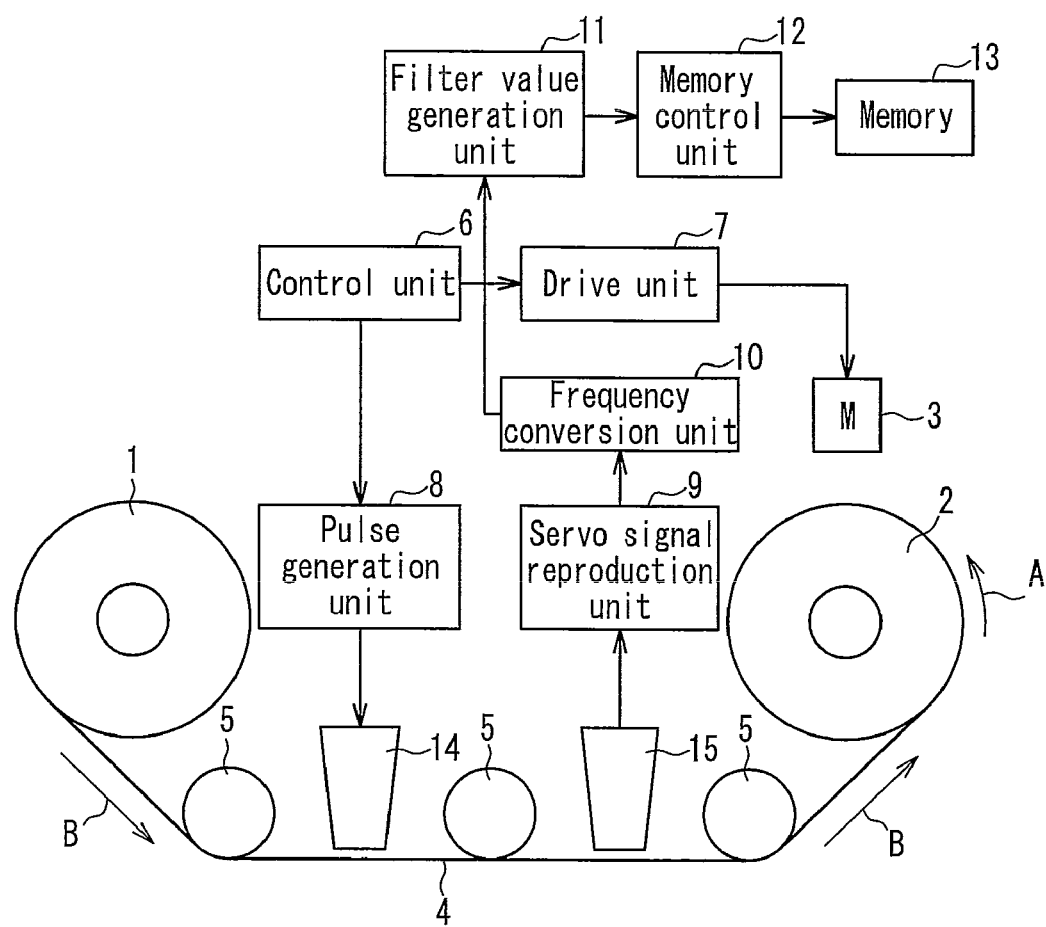
FIG. 1 is a block diagram of a servo signal recording apparatus according to Embodiment 1.

FIG. 1 is a block diagram of a servo signal recording apparatus according to Embodiment 1. The servo signal recording apparatus of Embodiment 1 is an apparatus for recording a servo signal to a pancake-like magnetic tape 4 wound on a reel 1 in the process of manufacturing magnetic tapes. In some cases, such an apparatus is called a servo writer.

As illustrated in FIG. 1, the servo signal recording apparatus includes a winding reel 2, a motor 3, guide rollers 5, a controller 6, a drive unit 7, a pulse generation unit 8, a servo signal reproduction unit 9, a frequency conversion unit 10, a filter value generation unit 11, a memory control unit 12, a first servo head 14, and a second servo head 15.

The winding reel 2 is rotatably driven by the motor 3 in a direction shown by the arrow A and is capable of winding up the magnetic tape 4 that is unwound from the reel 1 mounted on the apparatus of the present invention.

The motor 3 is drive-controlled by the drive unit 7.

The guide rollers 5 are capable of guiding the magnetic tape 4 so that the magnetic tape 4 unwound from the reel 1 runs at a prescribed position.

The controller 6 controls the period and amplitude of pulses generated by the pulse generation unit 8. The controller 6 outputs to the drive unit 7 an instruction to drive the motor 3.

The pulse generation unit 8 generates pulses under the control of the controller 6 and outputs the generated pulses to the first servo head 14. The first servo head 14 generates a servo pattern at a prescribed position on the magnetic tape 4, based on the pulses output from the pulse generation unit 8.

The servo signal reproduction unit 9 reproduces a servo signal based on an electric signal obtained by reading the servo pattern on the magnetic tape 4 with the second servo head 15.

The frequency conversion unit 10 converts a PES obtained from the servo signal reproduced by the servo signal reproduction unit 9 into frequency components by fast-Fourier-transform processing (hereinafter referred to as FFT processing).

The filter value generation unit 11 analyzes the frequency component output from the frequency conversion unit 10 and generates the values of a notch filter, which will be described later.

The memory control unit 12 controls the writing of information to a memory 13. Under the control of the memory control unit 12, the filter values generated by the filter value generation unit 11 are written to the memory 13.

Firstly, the controller 6 outputs an instruction to start driving the motor 3, to the drive unit 7. With the instruction from the controller 6, the drive unit 7 starts actuating the motor 3. When started up, the motor 3 rotatably drives the winding reel 2 in the direction shown by the arrow A and transports the magnetic tape 4 in the direction shown by the arrow B. This allows the magnetic tape 4 unwound from the reel 1 to slide into contact with the first servo head 14 and the second servo head 15 while being guided on the guide rollers 5 and thereby be wound on the winding reel 2. The magnetic tape 4 wound in a pancake shape on the reel 1 has an overall length of, for example, approximately 10000 m. The transport speed of the magnetic tape 4 is, for example, about 10 m/sec.

During the transport of the magnetic tape 4, on the other hand, the controller 6 outputs an instruction to generate pulses to the pulse generation unit 8. The pulse generation unit 8 outputs pulses having a prescribed period and prescribed amplitude, based on the instruction from the controller 6. The first servo head 14 is energized and un-energized repeatedly according to the pulses output from the pulse generation unit 8, and magnetizes a servo track of the magnetic tape 4 to form a servo pattern. The servo pattern is formed at an angle relative to a direction along the length of the magnetic tape 4. The servo pattern includes a first strip and a second strip. The first strip slants in a first direction. The second strip slants in a direction opposite to the slanting direction of the first strip. The first and second strips form approximately an inverted V-shaped configuration with an open apex.

Through the above operations, a servo signal is recorded on the magnetic tape 4. However, when such a magnetic tape that has recorded a servo signal through the above operations is mounted and transported on an information recording apparatus (what is called a "drive") that is capable of recording and reproducing a variety of data, periodic noise may be superimposed on a PES. One example of such periodic noise in Embodiment 1 is noise based on slitter components. The phrase "noise based on slitter components" as used herein refers to noise that occurs due to the curvature of the edge of a magnetic tape when running a magnetic tape that is produced from a pancake with a curved edge in an information recording apparatus; the curved edge of the pancake being formed in a slitting step of cutting up a bulk roll that is to be the basis of the magnetic tape 4. Such edge distortion of a magnetic tape caused by a slitter has a periodicity along the length of the magnetic tape. From this, it can be said that the noise based on slitter components has a periodicity along the length of the magnetic tape.

The feature of Embodiment 1 is that, after recording a servo signal on a magnetic tape 4 with a servo signal recording apparatus, the servo signal on the magnetic tape 4 is reproduced, and filter values that enable removal of periodic noise included in a PES obtained from the servo signal is written to a memory or the like. Before recording a variety of data to the magnetic tape 4, the information recording apparatus firstly reads out filter values from the memory, filters a PES so as to remove periodic noise therefrom, and performs tracking servo control based on the periodic-noise-free PES. Now, the operation of the servo signal recording apparatus that learns a PES obtained from a servo signal is described.

Figure 2:
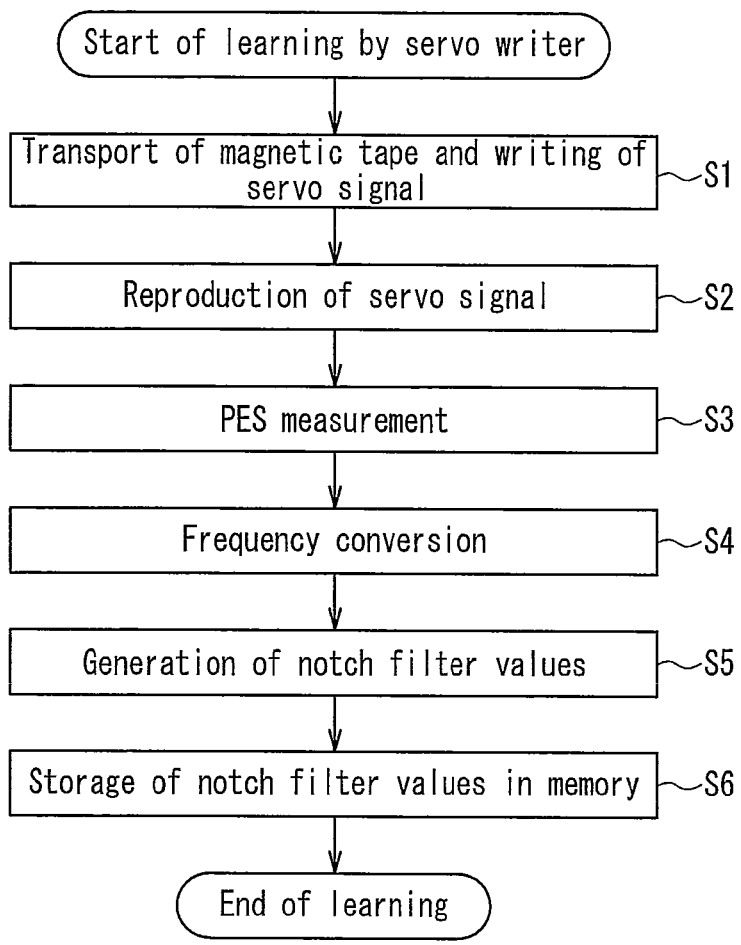
FIG. 2 is a flow chart showing a procedure for a learning operation in the servo signal recording apparatus according to Embodiment 1.

FIG. 2 shows a procedure for the operation of the servo signal recording apparatus according to Embodiment 1.

Firstly, the reel 1 with the magnetic tape 4 wound in a pancake shape is mounted on the servo signal recording apparatus, and the end of the magnetic tape 4 is wound on the winding reel 2 on the servo signal recording apparatus side. The winding reel 2 is then rotatably driven by the motor 3, starting transportation of the magnetic tape 4. Then, pulses having a prescribed period are input into the first servo head 14 and a servo signal is recorded on a servo track of the magnetic tape 4 (in step S1).

Then, the second servo head 15 reads a servo pattern recorded on the magnetic tape 4 and outputs an electric signal. The servo signal reproduction unit 9 reproduces a servo signal based on the electric signal output from the second servo head 15 (in step S2).

Then, the servo signal reproduction unit 9 calculates a PES based on the reproduced servo signal. Specifically, a PES is calculated from Equation 1 as follows. In Equation 1, a first strip A1 that slants in a first direction, a second strip B1 that slants in a second direction, a third strip C1 that slants in the first direction, and a fourth strip D1 that slants in the second direction, are formed in the order mentioned along the length of the magnetic tape 4:

$$PES=(AB-(A1B1/A1C1)\times 100)/2\times \tan Y \quad \text{(Equation 1)}$$

In Equation 1, "Y" is the tilt angle of the strips formed on a servo track of the magnetic tape 4 (in Embodiment 1, Y=6°). "AB" is the distance between the first strip A1 and the second strip B1 at the center across the width of the tape (in Embodiment 1, AB=50 μm). "A1B1" is the distance between the first strip A1 and the second strip BP. "A1C1" is the distance between the first strip A1 and the third strip C1. The PES is calculated using the above equation at prescribed periods. Such calculated PESs are sent in succession to the frequency conversion unit 10 (in step S3).

Note that the recording (S1) of a servo signal to the magnetic tape 4 with the first servo head 14 and the reproduction (S2) of a servo signal recorded on the magnetic tape 4 with the second servo head 15 may be performed simultaneously. Or another configuration is also possible in which, after a servo signal is recorded from the beginning to end of the magnetic tape 4, the magnetic tape 4 is rewound to the beginning and then runs from the beginning for reproduction of the servo signal.

Then, the frequency conversion unit 10 performs FFT processing of the PES sent from the servo signal reproduction unit 9 to convert the PES into frequency components. At this time, such FFT processing is performed for every turn of the reel 1.

Figure 3:
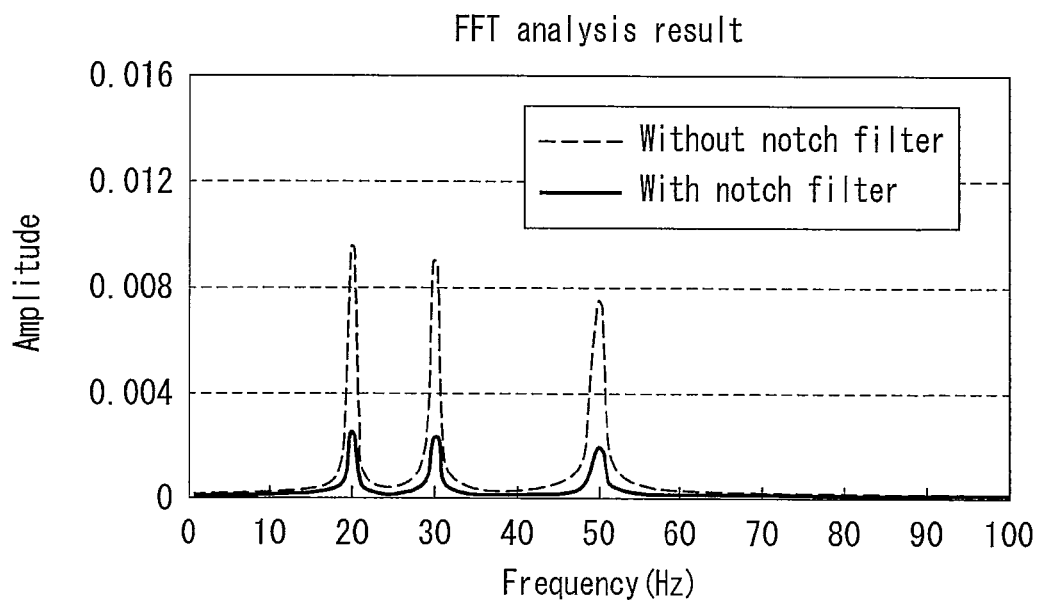
FIG. 3 is a graph showing the analysis results obtained through the fast Fourier transform of position error signals.

FIG. 3 shows analysis results obtained through such FFT processing. As indicated by the broken line in FIG. 3, it can be found that the values increase at certain frequency bands (in the example of FIG. 3, in the vicinities of 20 Hz, 30 Hz, and 50 Hz). Usually there is no periodicity in the occurrence of a noise component due to the deterioration of a PES caused by LTM (Lateral Tape Motion). However, since the curvature of the edge of the magnetic tape 4 caused by the accuracy of slitting, as described above, has a periodicity, the values each obtained by converting a PES into frequency components concentrate at certain frequency bands as illustrated in FIG. 3. The frequency components of a PES calculated by the frequency conversion unit 10 are sent to the filter value generation unit 11 (in step S4).

Then, the filter value generation unit 11 generates the values of a notch filter based on the frequency components generated by the frequency conversion unit 10. Specifically, the center frequency, the notch width, and the notch depth of a notch filter mounted on the information recording apparatus are calculated. The notch filter mounted on the information recording apparatus performs an arithmetic computation expressed by Equation 2.

$$G_N(s)=(S^2+2d\zeta\omega_n s+\omega_n^2)/(S^2+2\zeta\omega_n s+\omega_n^2) \quad \text{(Equation 2)}$$

The filter value generation unit 11 calculates the center frequency $\omega_n$, the notch width $\zeta$, and the notch depth d that enables the removal of the periodic noise illustrated in FIG. 3. The center frequency $\omega_n$, the notch width $\zeta$, and the notch depth d are at values that enable removal of the periodic noise illustrated in FIG. 3.

Figure 4:
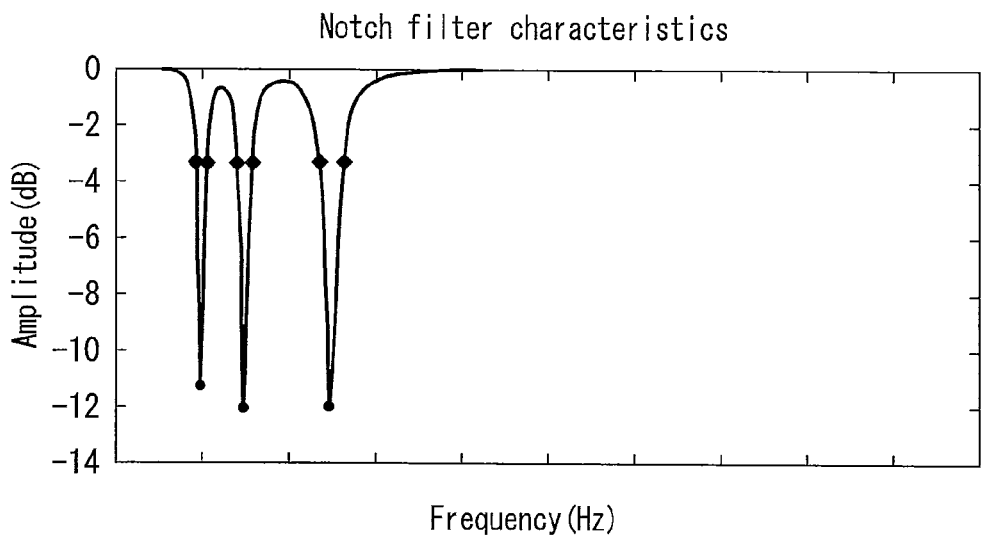
FIG. 4 is a graph showing the characteristics of a notch filter.

FIG. 4 shows the filter characteristics generated by the filter value generation unit 11. By providing the information recording apparatus with such a notch filter that is generated based on the filter characteristics as illustrated in FIG. 4, PESs caused by periodic noise can be reduced in amplitude as shown in the characteristics indicated by the solid line in FIG. 3 (in step S5).

Next, the memory control unit 12 writes the filter values generated by the filter value generation unit 11 to the memory 13. Note that the memory 13 is a semiconductor memory mounted on a cartridge that contains the magnetic tape 4. The memory 13 is written with, in addition to the filter values, a variety of information on the magnetic tape 4, a travel history of the information recording apparatus, and the like (in step S6).

The magnetic tape 4 that has recorded a servo signal through the above steps is cut to a prescribed length (e.g., 820 m), wound on the reel, and incorporated into a cartridge. The memory 13 is also mounted on the cartridge. With the above processing, a magnetic tape cartridge is completed.

In wiring a variety of data to a magnetic tape in such a magnetic tape cartridge that is produced according to Embodiment 1, firstly, the information recording apparatus reads out the filter values written in the memory 13 to generate a notch filter. This enables removal of periodic noise that occurs when recording a variety of data on the magnetic tape 4.

Embodiment 1 enables the acquiring of periodic noise by reproducing a servo signal recorded on the magnetic tape 4, calculating a PES from the reproduced servo signal, and converting the calculated PES into frequency components in the step of writing a servo signal using the servo signal recording apparatus. Further, by generating and writing to the memory 13 the filter values of a notch filter for reducing acquired periodic noise, the periodic noise in a PES can be removed at the time when the magnetic tape cartridge is mounted on the information recording apparatus and a variety of data is written to the magnetic tape 4. This consequently reduces the amplitude of PESs.

Note that while Embodiment 1 describes the configuration in which the filter values generated in the servo signal recording apparatus are written to the memory 13, a configuration in which the filter values are included in a servo signal recorded on the magnetic tape 4 is also possible.

Figure 5:
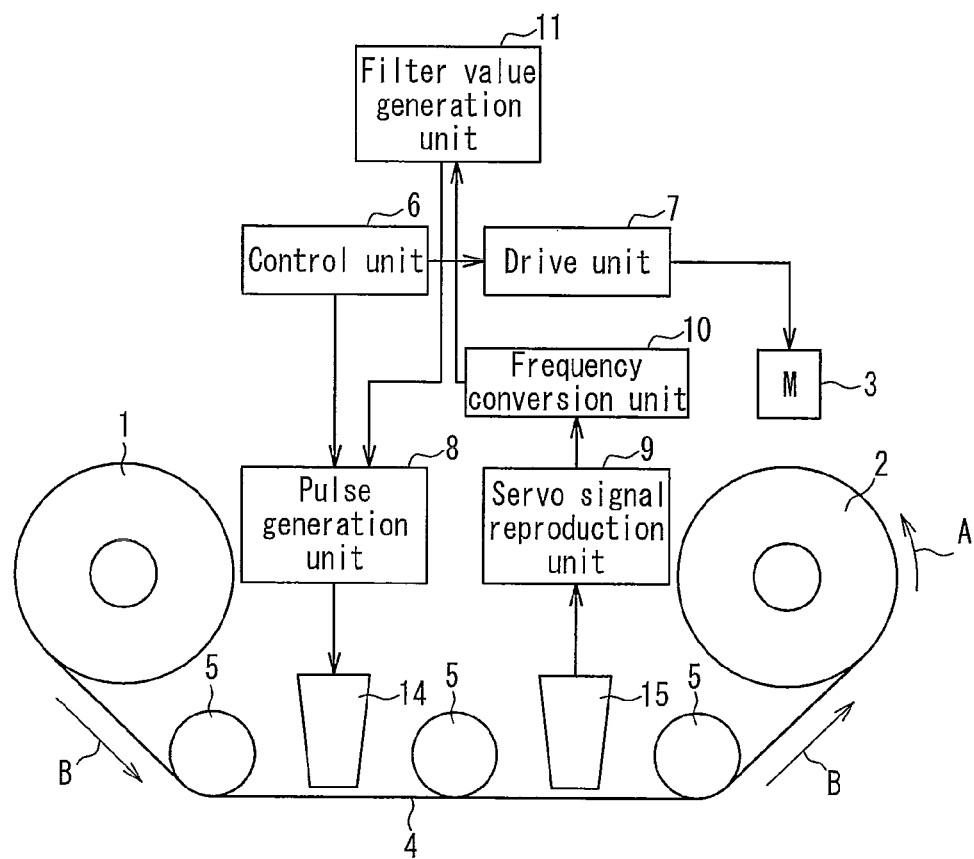
FIG. 5 is a block diagram showing another exemplary configuration of the servo signal recording apparatus according to Embodiment 1.

FIG. 5 is a block diagram of a servo signal recording apparatus that enables a servo signal to include filter values. The servo signal recording apparatus in FIG. 5 is different from that in FIG. 1 in that the filter values generated by the filter value generation unit 11 are input into the pulse generation unit 8. The pulse generation unit 8 modulates the period of pulses that is output to the first servo head 14, based on the filter values output from the filter value generation unit 11. Usually, the stripes of a servo signal are formed at regular intervals on a magnetic tape; however, by forming the stripes at different intervals with prescribed regularity, the servo signal can have information about filter values.

For instance, with a magnetic tape based on the LTO (Linear Tape Open) standard, five or four stripes that slant in the same direction are considered as a single group, and within the group, the stripes are spaced at different intervals with prescribed regularity. Each group is configured to include two patterns having different intervals of stripes and to have binary information by assigning the value 0 to one of the patterns and the value 1 to the other. Thus, by converting the filter values generated by the filter value generation unit 11 into digital data with an analog-to-digital converter (not shown) and modulating the pulses generated by the pulse generation unit 8 based on the digital data, a servo signal that includes information about the filter values can be recorded on the magnetic tape 4.

Embodiment 2

Figure 6:
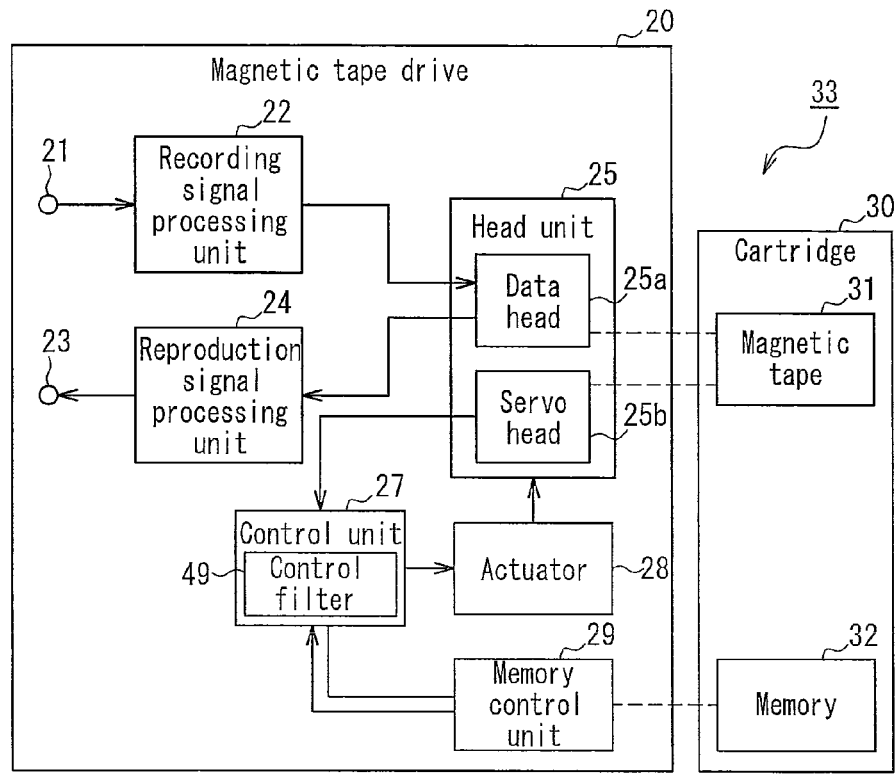
FIG. 6 is a block diagram of an information recording apparatus according to Embodiment 2.

FIG. 6 is a block diagram of a recording and reproduction apparatus according to Embodiment 2. As illustrated in FIG. 6, a recording and reproduction apparatus 20 includes an input terminal 21, a recording signal processing unit 22, an output terminal 23, a reproduction signal processing unit 24, a head unit 25, a control unit 27, an actuator 28, and a memory control unit 29. The recording and reproduction apparatus 20 is capable of attaching and detaching a magnetic tape cartridge 33. The magnetic tape cartridge 33 is provided with a cartridge 30, a magnetic tape 31, and a memory 32. The magnetic tape 31 is wound on a reel mounted within the cartridge 30. The memory 32 is, for example, a semiconductor memory capable of writing and reading information. The memory 32 is incorporated in the cartridge 30. Note that the recording and reproduction apparatus 20 is also provided with a mechanism for running the magnetic tape 31, a control circuit, and the like, which are neither shown nor described herein.

The input terminal 21 inputs data to be recorded on the magnetic tape 31. The data input into the input terminal 21 is digital data.

The recording signal processing unit 22 controls the current flowing in a data head 25a, based on the digital data input into the input terminal 21.

The output terminal 23 is capable of outputting digital data output from the reproduction signal processing unit 24 to another circuit or the like.

The reproduction signal processing unit 24 is capable of converting the data (analog signal) reproduced from the magnetic tape 31 into digital data with the data head 25a.

The head unit 25 is provided with the data head 25a and a servo head 25b. The head unit 25 is provided to be movable along the width of the magnetic tape 31. The data head 25a includes a data recording head and a data reproducing head. The servo head 25b is capable of reproducing a servo signal by scanning the stripes formed in a servo band of the magnetic tape 31.

The control unit 27 detects the current position of the head unit 25 along the width of the tape, based on the servo signal reproduced by the servo head 25b. The control unit 27 calculates the amount of off-track based on the position information on the current head unit 25 and tape motion information output from a memory control unit 29 (described later), and generates a control signal that controls the operations of the actuator 28 based on the amount of off-track. The generated control signal enables the position of the head unit 25 to be controlled. The control signal includes at least information on the direction of travel of the head unit 25 and information on the amount of travel thereof. The control unit 27 is provided with a control filter 49. The control filter 49 is capable of removing periodic noise and narrow-band noise included in a PES.

The actuator 28 is capable of moving the head unit 25 along the width of the magnetic tape 31, based on the control signal output from the control unit 27.

The memory control unit 29 communicates with the memory 32 mounted on the magnetic tape cartridge 33 and reads information recorded on the memory 32. The memory control unit 29 outputs at least the tape motion information from among the information read from the memory 32, to the control unit 27. In Embodiment 2, the memory control unit 29 establishes noncontact communication with the memory 32. Note that the present embodiment is not limited to the configuration in which the memory control unit 29 and the memory 32 establish noncontact communication therebetween, and it may adopt a configuration in which the memory control unit 29 and the memory 32 establish contact communication therebetween, such as magnetic communication, optical communication, or electrical communication.

In Embodiment 2, the magnetic tape cartridge 33 is based on the LTO standard. Such an LTO-based magnetic tape cartridge contains one reel with a magnetic tape wound thereon.

The magnetic tape 31 contains digital data recorded by the data head 25a. In Embodiment 2, the magnetic tape 31 based on the LTO standard has a tape width of approximately 12.65 mm.

The memory 32 is written with a variety of information about the cartridge 30, the magnetic tape 31, and the magnetic tape cartridge 33. The information written in the memory 32 includes the format of the magnetic tape 31, recording current (%), the range of the magnetic tape 31 on which data is written, and the like. The memory 32 is also written with the filter values of the control filter 49 provided in the control unit 27.

Figure 7:
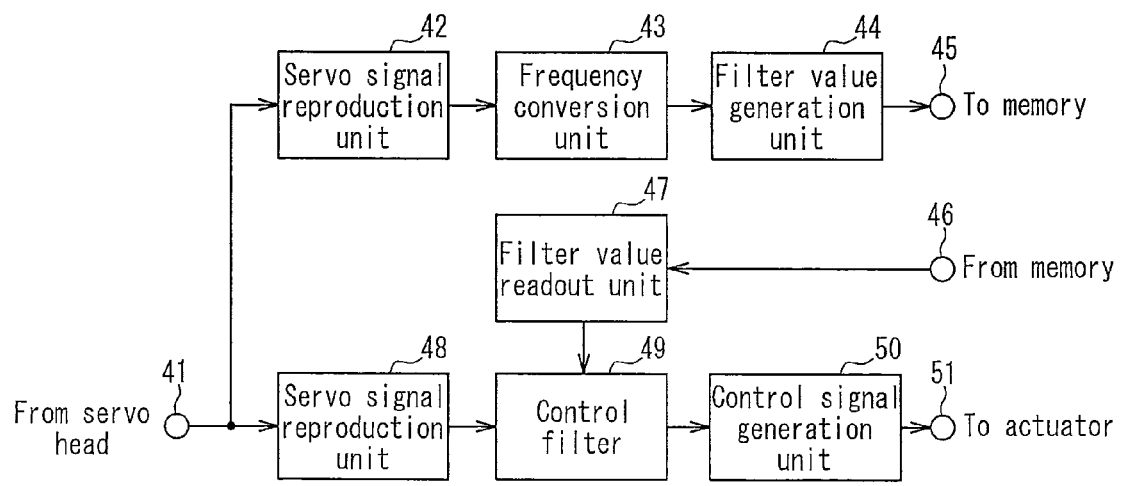
FIG. 7 is a block diagram of a control unit according to Embodiment 2.

FIG. 7 shows the internal configuration of the control unit 27. As illustrated in FIG. 7, a servo signal reproduction unit 42 reproduces a servo signal based on an electric signal input via an input terminal 41 connected to the servo head 25b (cf. FIG. 6).

Figure 9:
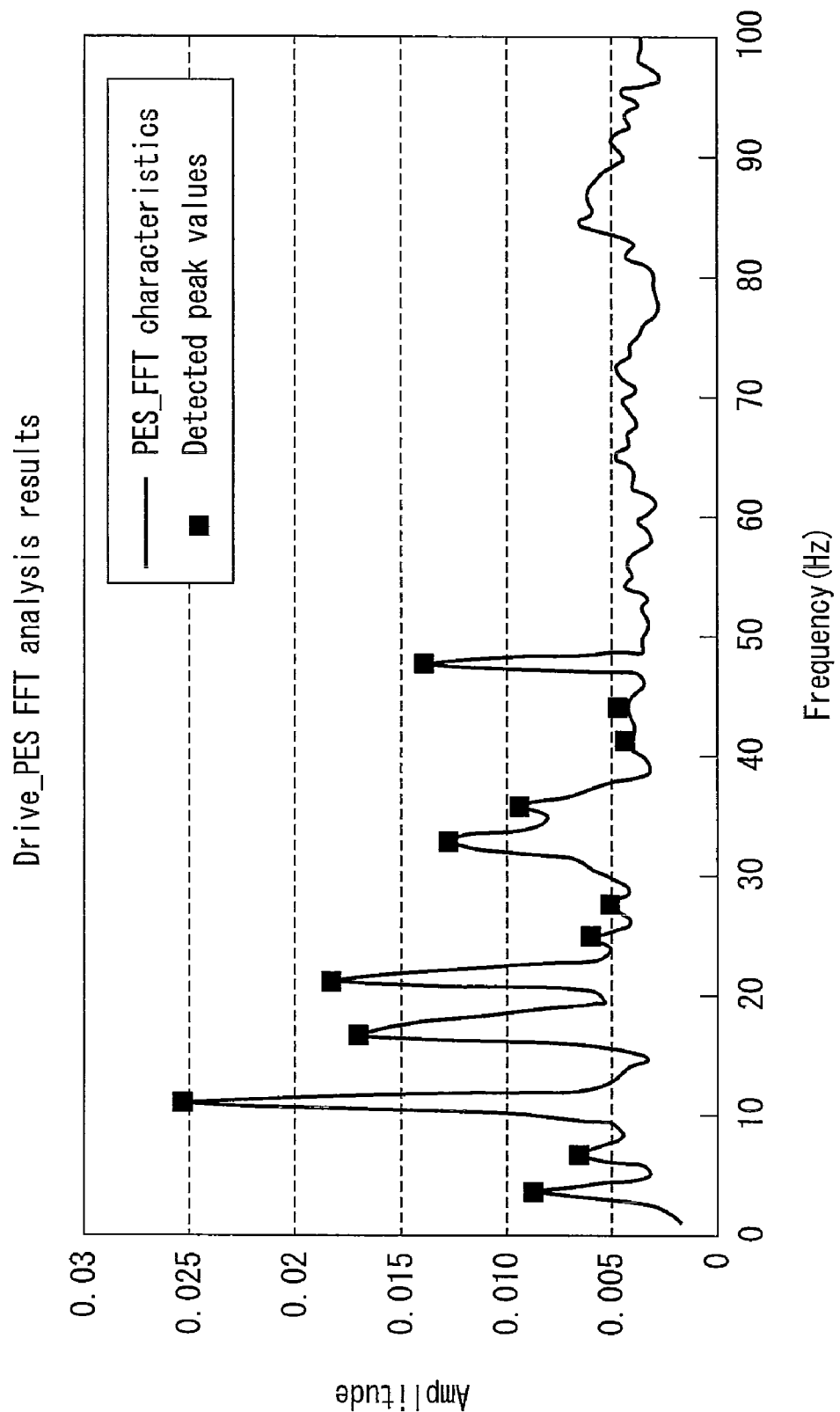
FIG. 9 is a graph showing the analysis results obtained through the fast Fourier transform of position error signals.
Figure 10:
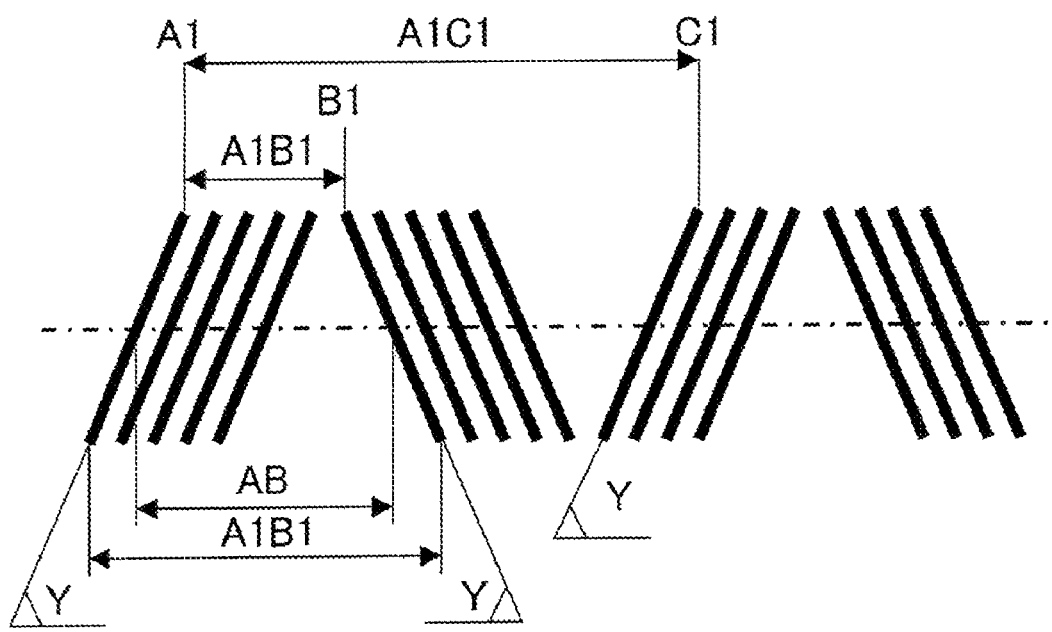
FIG. 10 is a drawing of a servo signal pattern denoted with variables found in Equations 1 and 3 herein described.

A frequency conversion unit 43 performs FFT processing of a PES that is obtained from the servo signal output from the servo signal reproduction unit 42 to convert the PES into frequency components. FIG. 9 shows the characteristics after the frequency component conversion.

A filter value generation unit 44 generates the values of a notch filter that operates in the control filter 49, based on the frequency components output from the frequency conversion unit 43. The generated filter values are output via an output terminal 45 to the memory controller 29.

A filter value readout unit 47 reads the filter values recorded on the memory 32 from the memory controller 29 via an input terminal 46.

A servo signal reproduction unit 48 reproduces a servo signal based on the electric signal input through the input terminal 41 connected to the servo head 25b (cf. FIG. 6) and calculates a PES using the above Equation 1.

The control filter 49 generates a notch filter based on the filter values obtained from the above Equation 2 and sent from the filter value readout unit 47 and removes periodic noise and narrow-band noise included in the PES output from the servo signal reproduction unit 48.

A control signal generation unit 50 calculates the amount of control (the amount of travel) of the head unit 25 based on the PES output through the control filter 49 and outputs a control signal to an output terminal 51.

The output terminal 51 is connected to the actuator 28.

In Embodiment 2, a learning operation is performed before data recording, for a magnetic tape cartridge 33 that is mounted for the first time on the information recording apparatus. The information recording apparatus is capable of grasping whether the mounted magnetic tape cartridge 33 is mounted for the first time or not, by analyzing drive history information (e.g., the serial number of the information recording apparatus) recorded on the memory 32 mounted on that magnetic tape cartridge 33. When the drive history information has no historical record of the information recording apparatus concerned, the learning operation is started. On the other hand, when the drive history information has a historical record of the information recording apparatus concerned, the information recording apparatus, without performing the learning operation, becomes capable of recording a digital signal.

Figure 8:
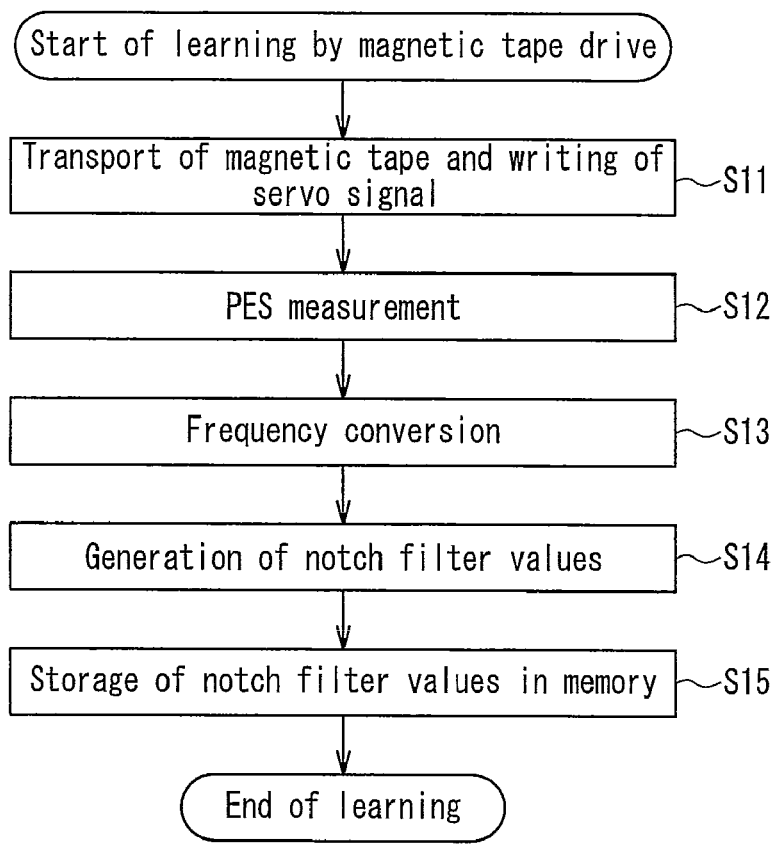
FIG. 8 is a flow chart showing a procedure for a learning operation in the information recording apparatus according to Embodiment 2.

FIG. 8 shows a procedure for the learning operation of the information recording apparatus according to Embodiment 2.

Firstly, the information recording apparatus draws a magnetic tape 31 included in the magnetic tape cartridge 33 out of the cartridge 30 using a loading mechanism (not shown) and winds the tape on a drive reel (not shown) within the information recording apparatus. Then, the drive reel is rotatably driven by a motor, starting the transportation of the magnetic tape 31. The information recording apparatus transports (forwards) the magnetic tape 31 from beginning to end and then transports (reviews) the tape from end to beginning. Note that in Embodiment 2, the transport speed of the magnetic tape 31 is approximately 6.1 m/sec. Since the overall length of the magnetic tape 31 housed in one magnetic tape cartridge 33 is approximately 820 m, the time required for a single round-trip between the beginning and end of the magnetic tape 31 is about four minutes.

During a single round-trip between the beginning and end of the magnetic tape 31, the servo head 25b reads the stripes formed on a servo track of the magnetic tape 31 and outputs an electric signal to the control unit 27. In FIG. 7, an electric signal received at the input terminal 41 is input into the servo signal reproduction units 42 and 48. The servo signal reproduction unit 42 reproduces a servo signal based on the input electric signal (in step S11). Note that the servo signal reproduction unit 48, the control filter 49, and the control signal generation unit 50 do not operate during the learning operation.

Next, the servo signal reproduction unit 42 calculates a PES based on the reproduced servo signal. Specifically, the PES is calculated from Equation 3 as follows. In Equation 3, a first strip A1 slants in a first direction, a second strip B1 slants in a second direction, a third strip C1 slants in the first direction, a fourth strip D1 that slants in the second direction, are formed along the length of the magnetic tape 31 in the order mentioned:

$$PES = (AB - (A1B1/A1C1) \times 100)/2 \times \tan Y \quad \text{(Equation 3)}$$

In Equation 3, "Y" is the tilt angle of the strips formed on a servo track of the magnetic tape 31 (in Embodiment 2, Y=6°). "AB" is the distance between the first strip A1 and the second strip B1 at the center across the width of the tape (in Embodiment 2, AB=50 μm). "A1B1" is the distance between the first strip A1 and the second strip B1. "A1C1" is the distance between the first strip A1 and the third strip C1. The PES is calculated using the above equation at prescribed periods. Such calculated PESs are sent in succession to the frequency conversion unit 43 (in step S12).

Next, the frequency conversion unit 43 performs FFT processing of the PES sent from the servo signal reproduction unit 42 to convert the PES into frequency components. FIG. 9 shows the analysis results obtained through such FFT processing. As illustrated in FIG. 9, the PESs sent from the servo signal reproduction unit 42 have larger values at certain frequency bands. Usually, there is no periodicity in the occurrence of PESs caused by LTM (Lateral Tape Motion); however, since the curvature of the edge of the magnetic tape 31 caused by the accuracy of slitting, as described above, has a periodicity, the values obtained by converting PESs into frequency components have peaks at certain frequency bands as illustrated in FIG. 9. Such frequency component information calculated by the frequency conversion unit 43 is sent to the filter value generation unit 44 (in step S13).

Next, the filter value generation unit 44 generates the values of a notch filter in the control filter 49, based on the frequency component information output from the frequency conversion unit 43. Specifically, the peaks (closed squares in the drawing) are detected from the frequency characteristics in FIG. 9, and then the center frequency, the notch width, and the notch depth of the notch filter for reducing noise at the frequency components, where the peaks are detected, are calculated. The notch filter mounted on the information recording apparatus performs an arithmetic operation expressed by Equation 4.

$$G_N(s) = (S^2 + 2d\zeta\omega_n s + \omega_n^2)/(S^2 + 2\zeta\omega_n s + \omega_n^2) \quad \text{(Equation 4)}$$

In the filter value generation unit 44, the center frequency $\omega_n$, the notch width $\zeta$, and the notch depth d, given by the above Equation 4, are calculated for every frequency where the peak is detected according to the results of FFT processing in FIG. 9. The generated filter values are output via the output terminal 45 to the memory control unit 29 (in step S14).

Next, the memory control unit 29 writes the filter values generated by the filter value generation unit 44 to the memory 32 (in step S15). Through the above steps, the learning operation is completed.

As described above, when writing a variety of data to the magnetic tape 31 in the magnetic tape cartridge 33 that is equipped with the memory 32 written with the filter values, firstly, the filter value readout unit 47 controls the memory control unit 29 and reads out the filter values written in the memory 32. Then, the filter value readout unit 47 sends the filter values read from the memory 32 to the control filter 49, and the control filter 49 generates the notch filter.

Next, the servo signal reproduction unit 48 reproduces a servo signal based on the electric signal input from the servo head 25b via the input terminal 41. The servo signal reproduction unit 48 calculates a PES based on the reproduced servo signal. The calculated PES is sent to the control filter 49. The control filter 49 passes the input PES to the notch filter to thereby remove periodic noise and narrow-band noise included in the PES. The PES output from the control filter 49 is input into the control signal generation unit 50. The control signal generation unit 50 generates a control signal including information on the amount of control for driving the actuator 28. That is, the control signal for moving the head unit 25 to a normal position across the width of the magnetic tape 31 is generated.

The actuator 28 moves the head unit 25 along the width of the tape based on the control signal generated by the control signal generation unit 50.

Embodiment 2 enables periodic noise and narrow-band noise to be removed from a PES by incorporating the control filter 49 serving as a notch filter into a feedback control system. Consequently PESs can be reduced in amplitude. Note that such periodic noise and narrow-band noise in a PES include cartridge-reel components, drive-reel components, tape edge components, and the like. The cartridge-reel components are caused by deformation or decentering of a reel included in the magnetic tape cartridge 33. The drive-reel components are caused by deformation or decentering of a drive reel mounted on the information recording apparatus. The tape edge components are caused by the curvature of the edge of a magnetic tape formed in the slitting step in the process of manufacturing the magnetic tape 31.

In addition, Embodiment 2 enables periodic noise and narrow-band noise caused by deformation or decentering of a reel included in the magnetic tape cartridge 33 or of a drive reel to be removed by the information recording apparatus performing the learning operation. This allows PESs to have lower amplitudes than in a configuration in which the servo signal recording apparatus performs the learning operation.

Embodiment 2 further enables filter values to be written for each information recording apparatus to the memory 32, by writing the calculated filter values to the memory 32 in correspondence with the serial numbers of the information recording apparatuses that have performed the learning operation. Therefore, even in the case where a single magnetic tape cartridge 33 is selectively used by a plurality of information recording apparatuses, periodic noise and narrow-band noise that differ among individual information recording apparatuses can be reduced by reading out the filter values corresponding to each individual information recording apparatus and passing PESs through the notch filter.

Note that the servo signal reproduction unit 9, the second servo head 15, and the servo head 25b described in Embodiment 1 or 2 are exemplary servo signal reproduction units of the present invention. In addition, the controller 6, the pulse generation unit 8, and the first servo head 14 in Embodiment 1 or 2 are exemplary servo signal recording units of the present invention. In addition, the frequency conversion units 10 and 43 in Embodiment 1 or 2 are exemplary frequency conversion units of the present invention. In addition, the filter value generation units 11 and 44 in Embodiment 1 or 2 are exemplary filter value generation units of the present invention. In addition, the memory control units 12 and 29 in Embodiment 1 or 2 are exemplary recording control units of the present invention. In addition, the control unit 27 in Embodiment 1 or 2 is an exemplary control unit of the present invention. In addition, the actuator 28 in Embodiment 1 or 2 is an exemplary actuator of the present invention. In addition, the control filter 49 in Embodiment 1 or 2 is an exemplary filter of the present invention.

The servo signal recording apparatus of the present invention is useful in apparatuses that are capable of recording a servo signal on a magnetic tape. Also, the information recording apparatus of the present invention is useful in apparatuses that use a magnetic tape as an information medium.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A servo signal recording apparatus capable of recording a servo signal on a servo track of a magnetic tape, comprising:
    a servo signal reproduction unit that reproduces a servo signal recorded on the magnetic tape;
    a frequency conversion unit that generates frequency component information by applying a Fourier transform to a PES (position error signal) represented by Expression (3) shown below obtained from the servo signal reproduced by the servo signal reproduction unit;
    a filter value generation unit that generates a filter value based on the frequency component information generated by the frequency conversion unit; and a recording control unit that writes the filter value generated by the filter value generation unit to a recording medium;

wherein the filter value generation unit generates a filter value that enables removal of a periodic noise component included in the frequency component information;

$$PES=(AB-(A1B1/A1C1)\times 100)/2 \tan Y \quad (3)$$

in expression (3), "Y" is the tilt angle of the strips formed on a servo track of the magnetic tape, "AB" is the distance between a first strip A1 and a second strip B1 at the center across the width of the tape, "A1B1" is the distance between the first strip A1 and the second strip B1, and "A1C1" is the distance between the first strip A1 and a third strip C1, wherein the first strip A1 slants in a direction opposite to a slanting direction of the second strip B1, and the third strip C1 slants in the same direction as the first strip A1, and wherein "A1B1" is a value between a maximum value and a minimum value of the distance between the first strip A1 and the second strip B1 that are read with the servo signal reproduction unit.

2. A servo signal recording apparatus including a servo signal recording unit capable of recording a servo signal on a servo track of a magnetic tape, comprising:

a servo signal reproduction unit that reproduces a servo signal recorded on the magnetic tape;

a frequency conversion unit that generates frequency component information by applying a Fourier transform to a PES (position error signal) represented by Expression (3) shown below obtained from the servo signal reproduced by the servo signal reproduction unit; and a filter value generation unit that generates a filter value based on the frequency component information generated by the frequency conversion unit;

wherein the filter value generation unit generates a filter value that enables removal of a periodic noise component included in the frequency component information;

wherein the servo signal recording unit modulates a servo signal based on the filter value generated by the filter value generation unit and records the modulated servo signal to the magnetic tape;

$$PES=(AB-(A1B1/A1C1)\times 100)/2 \tan Y \quad (3)$$

in expression (3), "Y" is the tilt angle of the strips formed on a servo track of the magnetic tape, "AB" is the distance between a first strip A1 and a second strip B1 at the center across the width of the tape, "A1B1" is the distance between the first strip A1 and the second strip B1, and "A1C1" is the distance between the first strip A1 and a third strip C1, wherein the first strip A1 slants in a direction opposite to a slanting direction of the second strip B1, and the third strip C1 slants in the same direction as the first strip A1, and wherein "A1B1" is a value between a maximum value and a minimum value of the distance between the first strip A1 and the second strip B1 that are read with the servo signal reproduction unit.

3. A magnetic tape apparatus comprising:

a head unit that includes a data head capable of recording a data signal to a magnetic tape and a servo head capable of reproducing a servo signal recorded on the magnetic tape, the head unit being provided so as to be movable along a width of the magnetic tape;

a control unit that calculates a PES (position error signal) represented by Expression (3) shown below based on the servo signal reproduced by the servo head and calculates the amount of travel for the head unit based on the calculated position error signal; and a movement unit that moves the head unit along the width of the magnetic tape, based on the amount of travel calculated by the control unit;

wherein the control unit includes:

a frequency conversion unit that generates frequency component information by applying a Fourier transform to the position error signal obtained from the servo signal reproduced by the servo head;

a filter value generation unit that generates a filter value based on the frequency component information generated by the frequency conversion unit;

a recording control unit that writes the filter value generated by the filter value generation unit to a recording medium; and a filter that filters the position error signal based on the filter value read from the recording medium; and wherein the filter value generation unit generates a filter value that enables removal of a periodic noise component included in the frequency component information;

$$PES=(AB-(A1B1/A1C1)\times 100)/2 \tan Y \quad (3)$$

in expression (3), "Y" is the tilt angle of the strips formed on a servo track of the magnetic tape, "AB" is the distance between a first strip A1 and a second strip B1 at the center across the width of the tape, "A1B1" is the distance between the first strip A1 and the second strip B1, and "A1C1" is the distance between the first strip A1 and a third strip C1, wherein the first strip A1 slants in a direction opposite to a slanting direction of the second strip B1, and the third strip C1 slants in the same direction as the first strip A1, and wherein "A1B1" is a value between a maximum value and a minimum value of the distance between the first strip A1 and the second strip B1 that are read with the servo signal reproduction unit.

4. A tracking servo method comprising the steps of:

reproducing a servo signal recorded on a servo track of a magnetic tape, using a servo head;

calculating a PES (position error signal) represented by Expression (3) shown below based on the servo signal;

performing control so that a head unit moves along the width of the magnetic tape, the head unit including the servo head and a data head capable of recording a data signal to the magnetic tape based on the position error signal, generating frequency component information by applying a Fourier transform to a position error signal obtained from the servo signal;

generating a filter value that enables removal of a noise component included in the frequency component information;

recording the filter value to a recording medium; and reading out the filter value from the recording medium to filter the position error signal;

$$PES=(AB-(A1B1/A1C1)\times 100)/2 \tan Y \quad (3)$$

in expression (3), "Y" is the tilt angle of the strips formed on a servo track of the magnetic tape, "AB" is the distance between a first strip A1 and a second strip B1 at the center across the width of the tape, "A1B1" is the distance between the first strip A1 and the second strip B1, and "A1C1" is the distance between the first strip A1 and a third strip C1, wherein the first strip A1 slants in a direction opposite to a slanting direction of the second strip B1, and the third strip C1 slants in the same direction as the first strip A1, and wherein "A1B1" is a value between a maximum value and a minimum value of the distance between the first strip A1 and the second strip B1 that are read with the servo signal reproduction unit.

5. A servo signal recording apparatus capable of recording a servo signal on a servo track of a magnetic tape, comprising:
a servo signal reproduction unit that reproduces a servo signal recorded on the magnetic tape;
a frequency conversion unit that generates frequency component information by applying a Fourier transform to a PES (position error signal) represented by Expression (3) shown below obtained from the servo signal reproduced by the servo signal reproduction unit;
a filter value generation unit that generates a filter value based on the frequency component information generated by the frequency conversion unit; and
a recording control unit that writes the filter value generated by the filter value generation unit to a recording medium;
wherein the filter value generation unit generates a filter value that is composed of a center frequency, a width, and a depth of a peak detected based on the frequency component information and that enables removal of a periodic noise component included in the frequency component information;

$$PES = (AB - (A1B1/A1C1) \times 100)/2 \tan Y \qquad (3)$$

in expression (3), "Y" is the tilt angle of the strips formed on a servo track of the magnetic tape, "AB" is the distance between a first strip A1 and a second strip B1 at the center across the width of the tape, "A1B1" is the distance between the first strip A1 and the second strip B1, and "A1C1" is the distance between the first strip A1 and a third strip C1, wherein the first strip A1 slants in a direction opposite to a slanting direction of the second strip B1, and the third strip C1 slants in the same direction as the first strip A1, and wherein "A1B1" is a value between a maximum value and a minimum value of the distance between the first strip A1 and the second strip B1 that are read with the servo signal reproduction unit.

6. A servo signal recording apparatus including a servo signal recording unit capable of recording a servo signal on a servo track of a magnetic tape comprising:
a servo signal reproduction unit that reproduces a servo signal recorded on the magnetic tape;
a frequency conversion unit that generates frequency component information by applying a Fourier transform to a PES (position error signal) represented by Expression (3) shown below obtained from the servo signal reproduced by the servo signal reproduction unit; and
a filter value generation unit that generates a filter value based on the frequency component information generated by the frequency conversion unit;
wherein the filter value generation unit generates a filter value that is composed of a center frequency, a width, and a depth of a peak detected based on the frequency component information and that enables removal of a periodic noise component included in the frequency component information; and
the servo signal recording unit modulates a servo signal based on the filter value generated by the filter value generation unit and records the modulated servo signal to the magnetic tape;

$$PES = (AB - (A1B1/A1C1) \times 100)/2 \tan Y \qquad (3)$$

in expression (3), "Y" is the tilt angle of the strips formed on a servo track of the magnetic tape, "AB" is the distance between a first strip A1 and a second strip B1 at the center across the width of the tape, "A1B1" is the distance between the first strip A1 and the second strip B1, and "A1C1" is the distance between the first strip A1 and a third strip C1, wherein the first strip A1 slants in a direction opposite to a slanting direction of the second strip B1, and the third strip C1 slants in the same direction as the first strip A1, and wherein "A1B1" is a value between a maximum value and a minimum value of the distance between the first strip A1 and the second strip B1 that are read with the servo signal reproduction unit.

7. A magnetic tape apparatus comprising:
a head unit that includes a data head capable of recording a data signal to a magnetic tape and a servo head capable of reproducing a servo signal recorded on the magnetic tape, the head unit being provided so as to be movable along a width of the magnetic tape;
a control unit that calculates a PES (position error signal) represented by Expression (3) shown below based on the servo signal reproduced by the servo head and calculates the amount of travel for the head unit based on the calculated position error signal; and
a movement unit that moves the head unit along the width of the magnetic tape, based on the amount of travel calculated by the control unit;
wherein the control unit includes:
a frequency conversion unit that generates frequency component information by applying a Fourier transform to the position error signal obtained from the servo signal reproduced by the servo head;
a filter value generation unit that generates a filter value based on the frequency component information generated by the frequency conversion unit;
a recording control unit that writes the filter value generated by the filter value generation unit to a recording medium; and
a filter that filters the position error signal based on the filter value read from the recording medium; and
wherein the filter value generation unit generates a filter value that is composed of a center frequency, a width, and a depth of a peak detected based on the frequency component information and that enables removal of a periodic noise component included in the frequency component information;

$$PES = (AB - (A1B1/A1C1) \times 100)/2 \tan Y \qquad (3)$$

in expression (3), "Y" is the tilt angle of the strips formed on a servo track of the magnetic tape, "AB" is the distance between a first strip A1 and a second strip B1 at the center across the width of the tape, "A1B1" is the distance between the first strip A1 and the second strip B1, and "A1C1" is the distance between the first strip A1 and a third strip C1, wherein the first strip A1 slants in a direction opposite to a slanting direction of the second strip B1, and the third strip C1 slants in the same direction as the first strip A1, and wherein "A1B1" is a value between a maximum value and a minimum value of the distance between the first strip A1 and the second strip B1 that are read with the servo signal reproduction unit.

8. A tracking servo method comprising the steps of:

reproducing a servo signal recorded on a servo track of a magnetic tape using a servo head;

calculating a PES (position error signal) represented by Expression (3) shown below based on the servo signal;

performing control so that a head unit moves along the width of the magnetic tape, the head unit including the servo head and a data head capable of recording a data signal to the magnetic tape based on the position error signal;

generating frequency component information by applying a Fourier transform to the position error signal obtained from the servo signal;

generating a filter value that is composed of a center frequency, a width, and a depth of a peak detected based on the frequency component information and that enables removal of a periodic noise component included in the frequency component information;

recording the filter value to a recording medium; and reading out the filter value from the recording medium to filter the position error signal;

$$PES = (AB - (A1B1/A1C1) \times 100)/2 \tan Y \quad (3)$$

in expression (3), "Y" is the tilt angle of the strips formed on a servo track of the magnetic tape, "AB" is the distance between a first strip A1 and a second strip B1 at the center across the width of the tape, "A1B1" is the distance between the first strip A1 and the second strip B1, and "A1C1" is the distance between the first strip A1 and a third strip C1, wherein the first strip A1 slants in a direction opposite to a slanting direction of the second strip B1, and the third strip C1 slants in the same direction as the first strip A1, and wherein "A1B1" is a value between a maximum value and a minimum value of the distance between the first strip A1 and the second strip B1 that are read with the servo signal reproduction unit.

\* \* \* \* \*